Nov. 29, 1960  F. A. MATHAMEL  2,962,698
VISUAL INDICATOR SYSTEM
Filed May 23, 1958  2 Sheets-Sheet 1

INVENTOR.
FLAVIUS A. MATHAMEL
BY
ATTORNEY

INVENTOR.
FLAVIUS A. MATHAMEL
BY
ATTORNEY

United States Patent Office 2,962,698
Patented Nov. 29, 1960

2,962,698

VISUAL INDICATOR SYSTEM

Flavius A. Mathamel, Allen Park, Mich., assignor to Burroughs Corporation, Detroit, Mich., a corporation of Michigan Filed May 23, 1958, Ser. No. 737,310

18 Claims. (Cl. 340—168)

This invention relates generally to visual indicator systems and is eminently suitable for use in indicator systems utilizing a plurality of tubes each of which contains several indicator elements that are selectively energized to display information. Typical applications of such indicator systems include the read-out or display of numerical or alphabetical information in connection with electronic computers, accounting machines, cash registers, display boards, digital meters, and the like.

For purposes of this description, the invention is illustrated as utilizing gaseous glow tubes for the indicator tubes, each tube being of the general type presently manufactured by Burroughs Corporation under the trademark "Nixie." Such tubes include a gas-filled transparent envelope, an anode, and a plurality of cathode indicator elements each configured in the shape of numerals, characters, and/or other symbols, such as "+" and "—" representations. Upon application of a suitable electric potential between the anode and the selected cathode element, a glow discharge is effected thereby producing a visual glowing image of the selected cathode. An example of a gaseous glow tube that could be used is one described in U.S. patent application Serial No. 578,371 by Joseph H. Engelman et al. filed April 16, 1956, now Patent No. 2,878,407 issued March 17, 1959. While the invention is eminently suitable for use with gaseous glow tubes of this type, it will be appreciated that the invention, or various features thereof, could be used with equal advantage with other indicator tubes and/or in other like systems.

Conventional plural tube systems of the foregoing type generally include a switch selector device for each of the tubes with individual wiring between each of the cathode indicator elements and its respective selector device. Such systems suffer from the drawback that a large number of conductor wires are required to connect all the cathode indicator elements of each tube to the respective selector. It has also been proposed to reduce this large number of wires by utilizing a "memory" technique. Such a system utilizes a single switch selector device for selecting the individual cathodes of all the tubes, and another switching device for selectively connecting the tubes to the first-mentioned switch. The "memory" is attained by applying a potential to all the tubes sufficient to sustain conduction once conduction starts, but not sufficient to initiate conduction between any selected cathode and its respective anode; and then selectively applying an additional initiating potential between a selected cathode and its anode by means of the switching devices mentioned above. An example of this technique is disclosed in U.S. Patent No. 2,142,106 of January 3, 1939. Such a system reduces substantially the number of conductor wires required, but does not provide reliable operation unless all the indicator tubes used in the system have constant and uniform firing, sustaining, and extinguishing discharge characteristics.

An object of the present invention is to provide an indicator system which requires fewer wires than the straight-wiring technique mentioned first above, but which does not depend, for reliable operation, on the constant and uniform characteristics among all the tubes that would be necessary in the system mentioned second above. According to the invention, this object is attained by utilizing a time-sharing, or multiplexing, technique for energizing the cathode indicator elements of the indicator tubes. By the arrangement of this invention, all the cathode elements of two tubes can be controlled from their respective switch selectors by a comparable number of wires as would be necessary for controlling the cathodes of just one tube in the straight-wiring technique.

In using this type of arrangement, it was found that "cross-talk" tended to produce, in one tube of a pair, a faint or "ghost" image of the indicator element selected in the other tube of the pair. Accordingly, another object of the present invention is to provide an indicator system of the foregoing type in which the "cross-talk" is substantially eliminated.

In applications of indicator systems where numerical data is to be displayed, it is frequently desirable to suppress the display of certain characters, such as "0"s to the left of the last significant digit. For example, in an application where "dollars" and "cents" information is to be read-out of an accounting machine or cash register, it would be preferable to display $3.40 in the form of "3.40" rather than "003.40." Accordingly, another important object of the present invention is to provide a visual indicator system that will automatically suppress the display of certain characters from certain tubes, such as the "0"s in the tubes to the left of the last significant digit displayed.

Still another object of the present invention is to provide an indicator system of the foregoing type which system includes means for extinguishing all the displays after a predetermined time subsequent to the last indication change in order to conserve the life of the tubes.

These and other objects and advantages, which will become readily apparent as the description proceeds, are attainable by the present invention which is described herein for illustrative purposes as embodied in an indicator system utilizing gaseous glow tubes for displaying numerical information.

Figure 1:
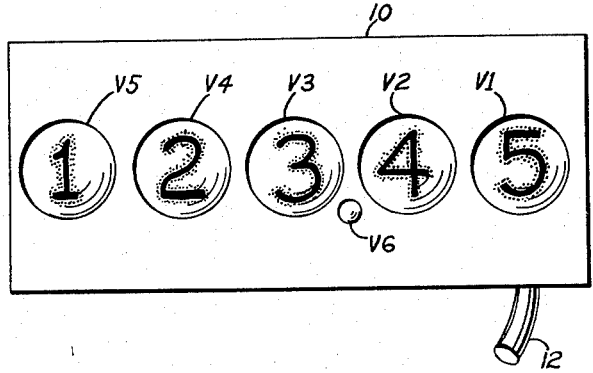
Fig. 1 is a front elevational view of a typical indicator panel displaying five orders of numerical data and a decimal point, to represent "dollars" and "cents" information.
Figure 4A:
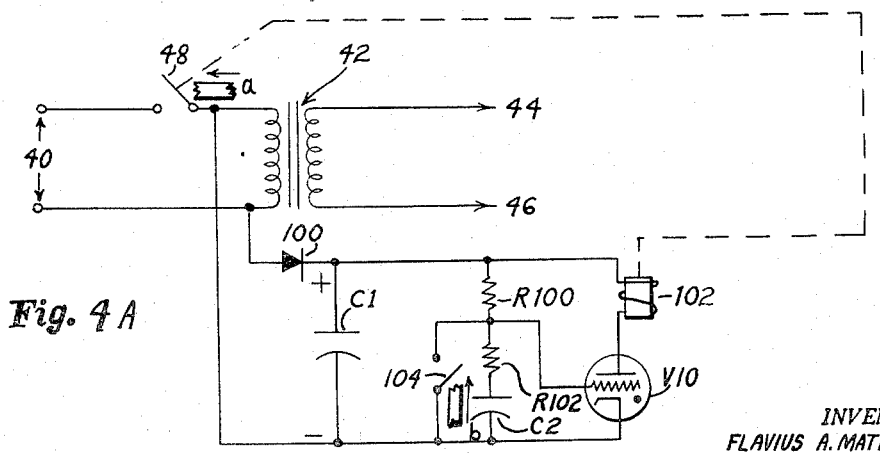
Figure 4B:
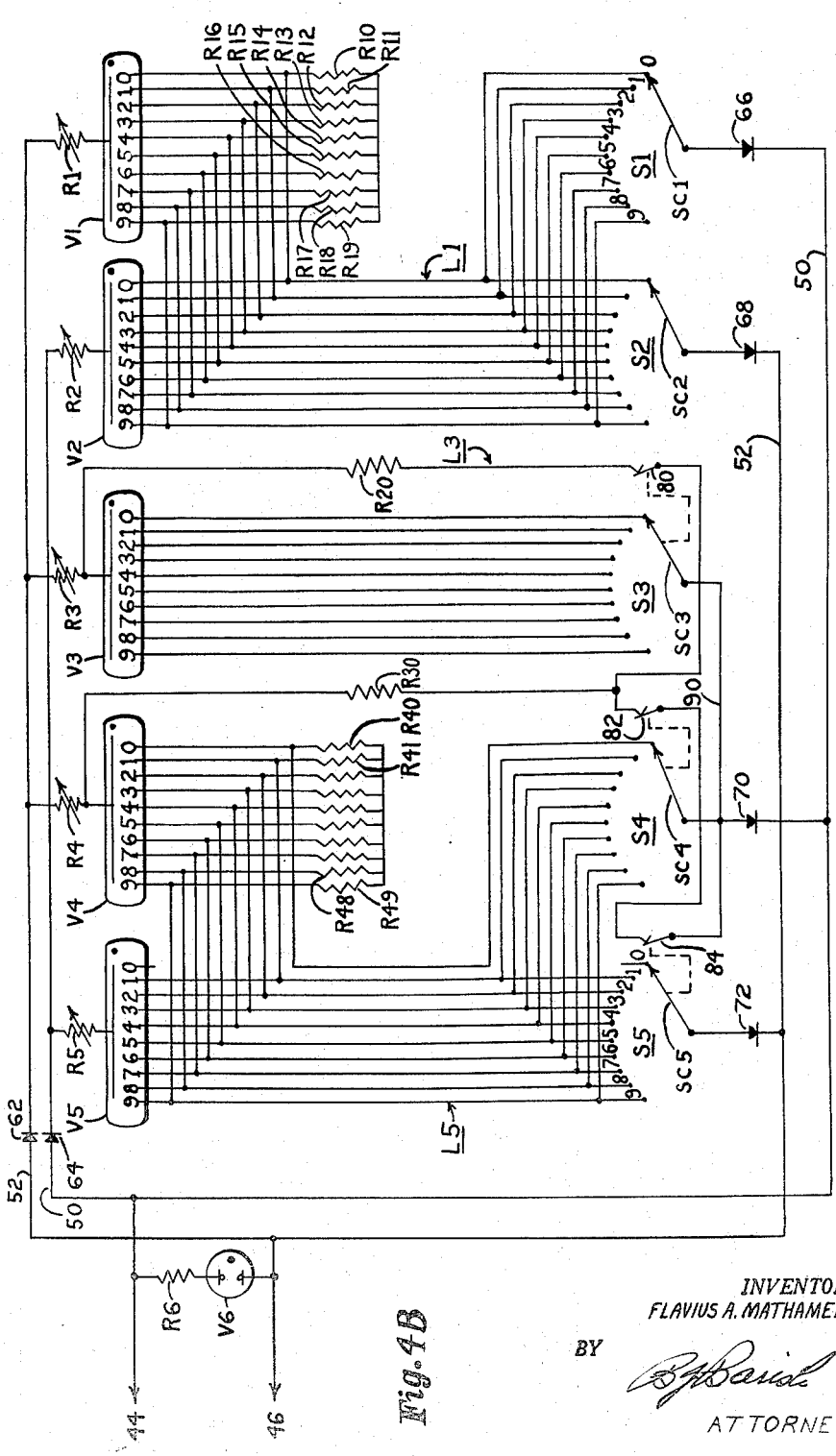

Fig. 4A and Fig. 4B, taken together, illustrate the circuit diagram designed in accordance with the invention for controlling the indicators of Fig. 1.

With reference to Fig. 1, it will be seen that the indicator system illustrated includes a housing or panel 10 mounting five indicator tubes V1–V5 representing numerical information, and a conventional glow discharge tube V6 representing the decimal point. Tubes V1–V5 are arranged to represent numerical information of ascending order. The system illustrated may be used for reading-out numerical data from an accounting machine or cash register, and its capacity would thus be "999.99."

A cable 12 connects all the indicator tubes to the power supply and the means for selecting the indicator elements to be displayed, which means can be proximately or remotely located with respect to the indicator tubes.

Figure 2:
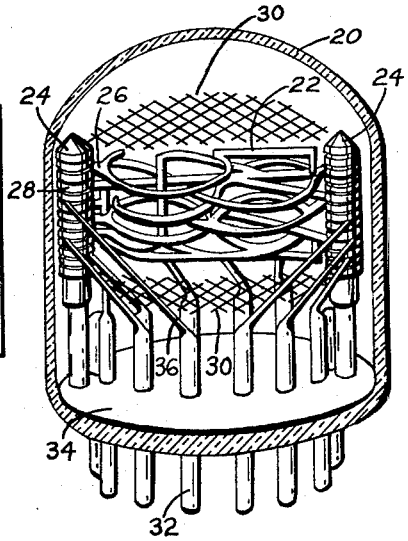
Fig. 2 is a front elevation, partially broken away, of a single numerical indicator tube of the gaseous glow type which may be used in the system of Fig. 1 and which is similar to the indicator tube described in the above-mentioned patent application.
Figure 3:
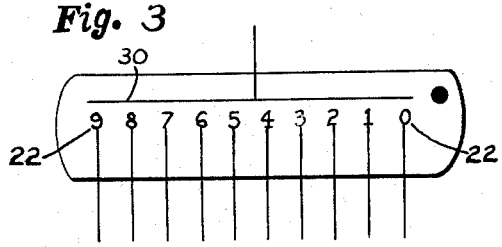
Fig. 3 is a diagrammatic representation of the structure of the tube of Fig. 2, illustrating the anode and the ten cathode indicator elements, the latter configured to represent numerals "0–9."

Figs. 2 and 3 illustrate the construction of a single numerical indicator tube which is of the type generally similar to that described in the above-mentioned patent application. It includes a transparent gas-filled envelope 20 having a stack of ten cathode indicator elements 22 configured in the shape of the numerals "0–9" supported in mutually spaced relationship by a pair of studs or posts 24. Each of the cathode indicator elements is supported on studs 24 by tabs 26 formed integral with the cathodes, and are mutually insulated from each other by insulating washers 28. The indicator tube also includes a pair of circular screen electrodes 30, one overlying, and one underlying, the stack of the cathode indicator elements, these electrodes also being supported by studs 24 and insulated from the cathodes by washers 28. As disclosed in the above-mentioned application, these electrodes prevent the sublimation of metal from the cathode onto the viewing portion of the glass envelope and may also serve as the anode. All the electrodes within the tube are connected to their respective pins 32 projecting through the base 34 by means of leads 36. It will thus be seen that upon application of a suitable potential between a selected cathode and the anode, a glow discharge will be effected to produce a luminous outline of the cathode selected.

The circuit for selecting the cathode indicator elements in each of the indicator tubes and for producing a glow discharge therein is shown in Figs. 4A and 4B taken together. Fig. 4A illustrates the power supply including the line 40 to which is connected a standard input of 115 volts, 60 cycle A.C. This is boosted by transformer 42 to provide 135 volts across terminals 44 and 46 which serves as the input to the circuit for the indicator system illustrated in Fig. 4B. A switch 48 is included in the input to transformer 42 for opening the line by the time-delay means to be later described.

With reference to Fig. 4B, it is seen that the indicator system includes the five numerical indicator tubes V1–V5 and the conventional gas diode V6. The latter tube serves as a decimal point indicator, when energized, and is therefore connected directly across the input leads 44, 46 in series with voltage-dropping resistor R6. If desired, tube V6 could be omitted, and a decimal point could be permanently marked on the panel or housing 10. Input leads 44, 46 are in turn connected to busses 50 and 52, respectively, for coupling the indicator tubes V1–V5 to the A.C. source.

The circuit also includes five selector switch devices S1–S5, one for each of the indicator tubes V1–V5. Each of the selectors S1–S5 is schematically illustrated as having ten switching elements, or fixed contacts, and a movable contactor (SC1–SC5) adapted to engage any of the fixed contacts. The selectors could be mechanical or electronic switches controlled from a keyboard, from internal mechanism of the art device with which the indicator system is to be used, or in any other suitable manner.

Each of the tubes V1–V5 is of the type illustrated in Fig. 2 ind includes a plurality of selectable indicator elements, these being the ten cathode indicator elements 22 configured in the shape of the numerals "0–9," and the electrode 30 serving as an anode for a selected cathode. When the potential between busses 50 and 52 is applied across the anodes and cathodes of the indicator tubes, a glow discharge will be produced at the selected cathode of each tube.

According to the invention, the tubes V1, V2, V4 and V5 are arranged in pairs and are connected to their respective selector switches by a common transmission line for each pair. Thus tube V1 is paired with tube V2, the cathode indicator elements "0–9" of each being connected to the fixed contacts "0–9" of its respective selector S1, S2 by transmission line L1; and tube V4 is similarly paired with tube V5 to their selectors S4, S5 through transmission line L5. Each individual cathode element of the two tubes in each pair is accordingly controlled by its respective selector switch through the same number of transmission wires that would be necessary for controlling the cathodes of just one tube in a straight-wiring technique. Tube V3, which is not paired with any of the other indicator tubes, illustrates the number of wires that would be required for controlling each tube in the conventional straight-wiring technique. As illustrated in the transmission wiring L3 for tube V3, it is seen that an individual conductor connects each of the switching elements of the selector S3 to each of the cathode indicator elements of the tube. There being ten cathodes in tube V3, ten transmission wires would be required for these connections.

With respect to the circuitry for controlling the two pairs of tubes V1, V2 and V4, V5, it is seen that for each of the two pairs only one group of ten transmission wires is necessary for connecting the cathode indicator elements to their respective selector switches. In each pair of tubes, the fixed contacts of the two selectors connect the same cathode of both tubes in series with the alternating source across busses 50 and 52. This would ordinarily result in enabling either selector to control the selection of a cathode in either of the tubes of the pair. However, as will be described, the circuit provides for time-sharing or switching means for applying the line potential across the anode of one tube of the pair with respect to its selected cathode during odd half-cycle alternations of the current source and for applying the line potential across the anode of the other tube with respect to its selected cathode during even half-cycle alternations. In this manner, each selector in the pair controls the energization of the cathodes only in its respective tube.

With particular reference to the pair of tubes V1 and V2, the individual cathode indicator elements "0–9" of both tubes are connected to the individual fixed contacts "0–9" of their respective selector switches S1 and S2 through the transmission line L1 of ten conductors. The anode of tube V1 is connected to buss 52 through a current limiting resistor R1 and through a unidirectional conducting device, or rectifier, 62. The resistor R1 may be variable to permit a preliminary adjustment of the resistance for that particular tube circuit. The movable contact SC1 of switch selector S1 for tube V1 is connected to the other buss 50 of the input line through rectifier 66.

Similarly, the anode of tube V2 is connected to buss 50 through resistor R2 and rectifier 64; and the movable contact SC2 of its switch selector S2 is connected to buss 52 through rectifier 68.

The rectifiers 62, 64, 66 and 68 are poled so that the A.C. line potential across busses 50 and 52 is applied across the tube V1, and its switch selector S1 in series therewith, during one of the half-cycle alternations of the current source; and is applied across tube V2, in series with its switch selector S2, during the other half-cycle alternations. The switch selectors S1 and S2 thereby control the selection of the cathodes in their respective tubes V1 and V2, since one tube (e.g. V1) is isolated from the A.C. source during the half-cycle that the other tube (e.g. V2) is energized in accordance with the selection of its switch selector S2, and vice versa. In this manner, the selection of the cathode indicator elements in both tubes V1 and V2 is controlled by its respective switch selector through a single transmission line L1 of ten conductors.

Tubes V4 and V5, which comprise a second pair, are similarly connected to their respective switch selectors S4 and S5 through a single transmission line L5. Here, the individual cathode indicator elements "0–9" of tube V4 are connected to the fixed contacts "0–9" of switch selector S4, and similar connections are made with respect to the cathode indicator elements of tube V5 and the fixed contacts of its switch selector S5. However, the "0" cathode indicator element of tube V5 is not connected to the fixed contact "0" of switch selector S5, because of the "0" suppression circuit to be later described.

The anode of tube V4 is connected through current limiting resistor R4 and rectifier 62 to buss 52; and the movable contact SC4 of its switch selector S4 is connected to buss 50 through rectifier 70. The latter connection is made through buss 90 which is part of the "0" suppression circuit to be later described. The anode of tube V5 is similarly connected to buss 50 through resistor R5 and rectifier 64; and the movable contact SC5 of its switch selector S5 is connected to the other buss 52 through rectifier 72. It will be appreciated that tube V4 will thereby be energized during the same half-cycle alternations as tube V1, but the selection of the cathode indicator element will be controlled by its switch selector S4; and that tube V5 will be energized during the same half-cycle alternations as tube V2, but the selection of its cathode indicator element will be controlled by its selector S5.

Tube V3 is not paired with any of the other tubes, but is connected across busses 50 and 52 through a straight-wiring technique wherein its individual cathodes "0–9" are directly connected to the fixed contacts "0–9" of its switch selector S3 through transmission line L3. The anode of tube V3 is connected to buss 52 through resistor R3 and rectifier 62, and the movable contact SC3 of its switch selector S3 is connected to buss 50 through rectifier 70. (Again, this latter connection is made through buss 90, which is part of the "0" suppression circuit to be later described.) Tube V3 will therefore be energized during the half-cycle alternations in which tubes V1 and V4 are energized, but the cathode indicator element which will be selected will be controlled by its switch selector S3.

The circuit further includes means for eliminating "cross-talk" which tended to produce, in one tube of a pair, a faint or "ghost" image of the indicator element selected in the other tube of the pair. For example, when using the circuit insofar as described above, the selection of the "1" cathode indicator element of tube V1 would tend to cause the "1" cathode indicator element of tube V2 to glow faintly because of the capacity between it and the other cathodes of tube V2 which then acted as anodes. To eliminate this, the circuit includes a group of ten impedances or resistors R10–R19 for the pair of tubes V1 and V2. One side of each resistor is connected to its respective cathode indicator element of tube V1, and thereby also of tube V2, and the other side of the resistors are connected together. These resistors tend to dissipate the capacitance between the cathode indicator elements so as to eliminate the "ghost" image. In a similar manner, resistors R40—R49 are connected to the cathode indicator elements of the pair of tubes V4 and V5. Resistors R10—R19 and R40—R49 may each be at about 100 kilohms.

The circuit also includes means for suppressing the display of certain characters from certain of the indicator tubes. In the circuit illustrated, the "0's" to the left of the last significant digit (i.e. "1"–"9"), are suppressed. This circuit is intended to be used for reading-out digital information from a cash register, accounting machine or like device, and accordingly the "0's" of tubes V1 and V2 are always to be displayed, but the "0's" to the left of the last significant digit in tubes V3, V4 and V5 are to be suppressed.

This is accomplished by providing a plurality of shunt circuits for the higher order tubes each including a load impedance connected to one side of the voltage source across busses 50, 52 and a normally closed switch in series therewith and connected to the other side of the voltage source. Each of the circuits thereby shunts its respective tube and selector switch so as to prevent any glow discharge in its respective tube. The normally closed switches in these circuits are all connected in series from the lower order tubes through the higher order tubes to the other side of the voltage source. Means are provided in each of these shunt circuits for opening the normally closed switch. This latter means is operated when any one of the selector switches is moved away from its "0" position to open the normally closed switch in the shunt circuit of its respective tube. This opens the shunt circuit for its respective tube as well as the shunt circuits for all the lower order tubes. Accordingly, the "0's" of the lower order tubes will be displayed, but the shunt circuits of any higher order tubes will still be effective to suppress the display of "0's" in any of such higher order tubes.

More particularly, the circuit for tube V3 includes a shunting resistor R20 and a switch 80; similarly, the circuit for tube V4 includes a shunting resistor R30 and a switch 82. Tube V5, however, need not include a shunting resistor (as will be later explained), but does have a switch 84 comparable to switches 80 and 82. Resistors R20 and R30 may each be of about 10 kilohms.

One end of resistor R20 is connected to the anode of tube V3, and the other end of the resistor is connected to the fixed contact of switch 80. The resistor R30 for tube V4 is similarly connected to the anode of that tube, and to the fixed contact of its switch 82. The movable contact of switch 80 for tube V3 is connected to the fixed contact of switch 82 for tube V4; and the movable contact of switch 82 is connected to the fixed contact of switch 84 for tube V5. The movable contact of switch 84 is connected to a buss 90 which in turn is connected to buss 50 through rectifier 70.

Switches 80, 82 and 84 of the "0" suppression circuit are normally closed, thereby shunting their respective circuit are normally closed, thereby shunting their respective tubes and preventing their energization. However, the movable contacts of each of these switches are actuated to open when the movable contacts SC3—SC5 of switch selectors S3—S5 are moved away from the "0" fixed contact to any of the "1–9" contacts. For this purpose, the movable contacts of the "0" suppression switches 80, 82 and 84 may be mechanically coupled to the movable contact of their respective switch selectors S3—S5. This is schematically shown on the drawing by the dotted lines between switch 80 and removable contact SC3, switch 82 and movable contact SC4, and switch 84 and movable contact SC5. The movable contacts SC3 and SC4 are connected to buss 90, which in turn is connected to buss 50 through rectifier 70. The movable contact SC5 for tube V5 is connected to buss 52 through rectifier 72, as earlier disclosed.

From the foregoing description, it will be seen that tubes V1 and V2 will always display the "0's," but that the "0's" in tubes V3, V4 and V5 to the left of the last significant digit will be suppressed. For example, consider the condition where switch selectors S1—S5 are set so that the movable contact of S1 is on the "1" fixed contact, the movable contact of S2 is on the "0" contact, and switch selectors S3, S4 and S5 are each on their "0" contacts. The numerical information that will thereby be displayed will be ".01" (the decimal point being displayed by tube V6). If, however, the movable contact of S3 is on the "1" contact, the display will be "1.01." The "1" of tube V3 will be displayed since its "0" suppression switch 80 is opened by the movable contact S3 when moved from the "0" contact. The "0" of tube V4 however will be suppressed, as its switch 82 remained closed thereby maintaining the shunt across the tube V4, this shunt circuit including resistor R30, switch 82, switch 84 (also remaining closed because movable contact SC5 remained in its "0" position), buss 90, rectifier 70 and buss 50.

On the other hand, if switch selector S3 is in the "0"

position (whereby switch 80 remains closed), and switch selector S4 is moved to e.g. the "1" position, it will be seen that the "0" of tube V3 is not suppressed, since open switch 82 prevents the completion of the shunt including resistor R20 to buss 50.

As indicated earlier, a shunt is not necessary in the circuit of the last tube V5. To suppress the "0" in tube V5, the "0" cathode indicator element is not connected to the "0" fixed contact of selector switch S5. Thus, a "0" will never be displayed in tube V5. Since tube V5 is the highest order tube in the arrangement illustrated, its "0" will always be to the left of the last significant digit displayed in the lower order tubes, and therefore it need not be displayed. The control circuit for tube V5, however, does include a switch 84 controlled by its switch selector S5 in the same manner as tubes V3 and V5, in order to complete the "0" suppression circuits of these lower order tubes.

The system illustrated also includes means for extinguishing all displays of tubes V1—V6 after a predetermined time subsequent to the last operation of the indicator tubes or change in setting of any of the selector switches. This latter means disconnects the indicator tube system in order to conserve the life of the tubes. It utilizes a self-extinguishing time-delay system somewhat similar to that described in copending application Serial No. 404,116, filed January 14, 1954 now Patent No. 2,840,204 of June 24, 1958.

Fig. 4A illustrates the circuit for disconnecting the indicator tube system. This circuit controls line switch 48 to open same when the predetermined time-delay has expired. To provide the time-delay, the line voltage is applied, through half-wave rectifier 100 and filter capacitor C1, across a network including a high value resistor R100, a low-value resistor R102, and a capacitor C2. The junction between resistors R100 and R102 is connected to the grid of a gas triode V10. The cathode of tube V10 is connected to the negative side of the rectified input, and the anode of tube V10 is connected to the positive side through a solenoid 102. A switch 104 shunts the resistor 102 and capacitor C2.

Line switch 48 is a bistable type switch which will normally remain in either its closed or open position until actuated to the other position. This switch is normally open, but is actuated to its closed position as soon as the system utilizing the indicator display is operated. This switch could be manually closed when the indicator system is desired to be used. However, where the indicator system is to be used in connection with a cash register or an accounting machine, the normally open switch 48 is preferably closed by an element in the machine, as for example a rack that moves in the early part of the cycle of the machine. Fig. 4A schematically illustrates the rack actuator "a" for line switch 48, which closes the switch during the early part of the machine cycle, thereby connecting the indicator display system to the line. Switch 48 remains closed until the time-delay has expired, at which time it is opened by energization of solenoid 102. Fig. 4A schematically illustrates the mechanical connection of switch 48 with solenoid 102 by the dotted lines.

Switch 104 in the time-delay circuit is a monostable type switch which is normally open as its only stable condition. That is, the switch is normally open and closes only when the actuator is acting upon it, and as soon as the actuator is removed, the switch returns open. The actuator for the switch may be anything that closes the switch during a change in setting of any of the selector switches, or during an operation of the indicator system or the art device with which it is used. It is schematically illustrated in Fig. 4A as element "b" which may be any element of the machine, as for example another rack, which moves during each machine cycle; on the other hand, it may be an element which is moved directly from the selector switches when the setting of any of the selector switches is changed. The purpose of this switch, as will be described below, is to reset to "0" the time-delay device during each change in display or during each operation of the indicator system or machine with which it is used. In this manner, the time-delay which is to expire before the indicator system is to be extinguished is always reset during every change in indication or operation of the machine, so that only after the indicator system or machine remains idle for a predetermined time, will the indicator system be extinguished.

The time-delay is determined by the parameters of the circuit, comprising the resistors R100 and R102 and capacitor C2, which controls the grid of gas tube V10. As soon as line switch 48 is closed, in the manner described above, a charging current for capacitor C2 will immediately flow through resistors R100 and R102. The resistance of R100 is much higher than that of R102, so that most of the voltage drop during the high initial charging current will be produced across resistor R100. Accordingly, during the initial charging of capacitor C2, the grid of tube V10 will be at a slightly more positive potential than its cathode, which will be insufficient to fire the tube. As the charge on capacitor C2 gradually builds up according to the time constant of the charging network (i.e. R100, R102 and C2), the grid of tube V10 will become more positive with respect to its cathode until such time as the tube will fire, energizing solenoid 102, which in turn opens line switch 48 to disconnect the indicator system from the line and to deenergize tube V10. Tube V10 is therefore normally nonconducting, and conducts momentarily only when the time-delay has expired in order to open line switch 48.

As mentioned above, when line switch 48 is opened, it remains open until it is closed manually or by a machine operation thereby reconnecting the indicator system to the line.

Normally open switch 104 provides a discharge path for capacitor C2 in order to reset the time-delay circuit, the discharge path being through low-value resistor R102 and the switch. As mentioned earlier, this switch is closed during every operation of the indicator system or machine with which the indicator system is used. Accordingly, every time that switch 104 is closed it quickly discharges capacitor C2, and thereby resets the time-delay circuit. It will therefore be appreciated that tube V10 will not be fired while the indicator system or machine is being continuously used, but will only be fired when the indicator system or machine remains idle for the predetermined time as controlled by the parameters of the time-delay charging circuit.

Depending upon the parameters of the circuit illustrated, the time-delay for extinguishing the indicator system may be set for any desired time, such as one minute or more. Typical values for the components are as follows: Tube V10 is a cold cathode thyratron of the kind supplied as type No. 5823 by the Radio Corporation of America; resistor R100 is 30 megohms; resistor R102 is one kilohm; capacitor C2 is an oil filled capacitor of 2 mfd.; and capacitor C1 is an electrolytic capacitor of 8 mfd.

While the invention has been described with respect to a preferred embodiment thereof, it will be appreciated that the novel aspects thereof, taken alone or in combination, may be used in systems other than that specifically illustrated, and that many other changes and variations may be made within the spirit and scope of the invention as defined in the following claims.

What is claimed is:

1. A visual indicator system comprising a pair of gaseous glow tubes each including an anode and a plurality of individual cathode indicator elements, a pair of switching means one for each tube, each switching means being settable to engage any one of a plurality of switching elements for selecting a cathode in each tube, and circuit means for producing in each tube a glow discharge at a selected cathode to provide a visual indication, said circuit means including a source of A.C. potential, wiring common to both said tubes connecting the switching elements of both said switching means to the individual cathode indicator elements of both said tubes, and means for applying the potential from the A.C. source across the anode of one tube of the pair with respect to its selected cathode during odd half-cycle alternations and for applying the potential from the A.C. source across the anode of the other tube of the pair with respect to its selected cathode during even half-cycle alternations.

2. A system as defined in claim 1 wherein said last-named means comprises unidirectional conducting devices poled to apply half-cycle alternations of the A.C. potential alternately across one of said tubes and its switching means and then across the other of said tubes and its switching means.

3. A system as defined in claim 2 wherein said circuit means further includes a plurality of impedance corresponding in number to the number of cathode indicator elements in one of said tubes, said impedances being all connected together at one of their ends and being individually connected to a cathode indicator element of said one tube at their other ends.

4. A system as defined in claim 1 wherein said system further includes means for suppressing any glow discharge of at least one tube controlled by the setting of the switching means for said at least one tube.

5. A system as defined in claim 4 wherein said suppression means comprises a shunt circuit across said at least one tube which is enabled to shunt said tube when its switching means is set in accordance with a predetermined setting.

6. A system as defined in claim 1 wherein said system further includes means for disconnecting all the tubes from the A.C. potential at a predetermined time after the last change in setting of any of said switching means.

7. A visual indicator system comprising a plurality of gaseous flow tubes each including a plurality of individual cathode indicator elements configured in the shape of numerals "0–9," said tubes being arranged to represent numerical information of ascending order, a plurality of switching means one for each tube, each switching means being settable from positions "0–9" for selecting the corresponding cathode element in each tube, and circuit means for producing in each tube a glow discharge at a selected cathode element to provide a visual indication of numerical information of ascending order, said circuit means including a source of A.C. potential, a plurality of transmission lines connecting the cathode indicator elements of each tube to the switching means for that tube, at least one of said transmission lines being common to a pair of tubes and their switching means, and means for applying the potential from the A.C. source across one tube of the pair and its respective switching means during odd half-cycles of the A.C. potential, thereby producing a glow discharge therein at the selected cathode indicator element, and for applying the potential from the A.C. source across the other tube of the pair and its respective switching means during even half-cycles of the A.C. potential, thereby producing a glow discharge therein at the selected cathode indicator element.

8. A system as defined in claim 7 wherein said last-named means comprises unidirectional conducting devices poled to apply half-cycles of the A.C. potential alternately across one of the tubes and switching means in the pair and then across the other of the tubes and switching means in the pair.

9. A system as defined in claim 8 wherein said circuit means further includes a group of resistors for each pair, each group having a number of resistors corresponding to the number of cathode indicator elements in one tube of its pair, the resistors of each group being connected together at one of their ends and being individually connected to a cathode indicator element of said one tube of its pair at their other ends.

10. A system as defined in claim 7 wherein said system further includes means for suppressing any glow discharge of at least one tube controlled by the setting of the switching means for said at least one tube.

11. A system as defined in claim 10 wherein said suppression means comprises a shunt circuit across said at least one tube which is enabled to shunt said tube when its switching means is set in accordance with a predetermined setting.

12. A system as defined in claim 7 wherein said circuit means further includes means for suppressing a glow discharge at the "0" cathode indicator elements of tubes of higher order than the highest order tube which produces a glow discharge at any of its "1"–"9" cathode indicator elements.

13. A system as defined in claim 12 wherein said last-named means comprises a plurality of shunt circuits for the higher order tubes, each including a load impedance connected to one side of the A.C. source and a normally closed switch in series with the load impedance connected to the other side of the A.C. source thereby shunting its respective tube and switching means, all said normally closed switches being connected in series to said other side of the A.C. source, and means controlled by the setting of any of the switching means to other than its "0" position for opening the normally closed switch in the shunt circuit for its respective tube thereby rendering ineffective the shunt circuit for its respective tube as well as the shunt circuits for all tubes of lower order.

14. A system as defined in claim 7 wherein said system further includes means for disconnecting all the tubes from the A.C. potential at a predetermined time after the last change in setting of said switching means.

15. A visual indicator system comprising a plurality of gaseous glow tubes each including a plurality of individual cathode indicator elements configured in the shape of numerals "0–9," said tubes being arranged to represent numerical information of ascending order, a plurality of switching means one for each tube, each switching means being settable from positions "0–9" for selecting the corresponding cathode in each tube, and circuit means for producing glow discharges at a selected cathode of certain tubes to provide a visual indication of numerical information of ascending order, said circuit means including a source of potential across all said tubes and their respective switching means, transmission lines connecting the cathode indicator elements of each tube to the switching means for that tube, and means controlled by the setting of the switching means for at least one tube for suppressing any glow discharge at said at least one tube.

16. A system as defined in claim 15 wherein said suppression means comprises a shunt circuit across said at least one tube which is enabled to shunt said tube when its switching means is set in accordance with a predetermined setting.

17. A system as defined in claim 15 wherein said suppression means comprises a plurality of shunt circuits for the higher order tubes each including a load impedance connected to one side of the source of potential and a normally closed switch in series with the load impedance and connected to the other side of the source of potential thereby shunting its respective tube and switching means, all said normally closed switches being connected in series to said other side of the source of potential, and means controlled by the setting of any of the switching means to other than its "0" position for opening the normally closed switch in the shunt circuit for its respective tube thereby rendering ineffective the shunt circuit for its respective tube as well as the shunt circuits for all tubes of lower order.

18. A system as defined in claim 15 wherein said system further includes means for disconnecting all the tubes from the source of potential at a predetermined time after the last change in setting of said switching means.

References Cited in the file of this patent

UNITED STATES PATENTS 2,142,106    Boswan  ---------------- Jan. 3, 1939